United States Patent
Pandey et al.

(10) Patent No.: US 11,038,775 B2
(45) Date of Patent: Jun. 15, 2021

(54) MACHINE LEARNING-BASED CLIENT SELECTION AND TESTING IN A NETWORK ASSURANCE SYSTEM

(71) Applicant: Cisco Technology, Inc., San Jose, CA (US)

(72) Inventors: Santosh Ghanshyam Pandey, Fremont, CA (US); Jean-Philippe Vasseur, Saint Martin d'uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 16/100,451

(22) Filed: Aug. 10, 2018

(65) Prior Publication Data

US 2020/0052981 A1    Feb. 13, 2020

(51) Int. Cl.
| | |
|---|---|
| *H04L 12/24* | (2006.01) |
| *H04L 12/26* | (2006.01) |
| *H04W 24/06* | (2009.01) |
| *H04B 17/318* | (2015.01) |
| *H04W 84/12* | (2009.01) |
| *G06N 20/00* | (2019.01) |

(52) U.S. Cl.
CPC ....... *H04L 41/5038* (2013.01); *H04B 17/318* (2015.01); *H04L 41/0636* (2013.01); *H04L 41/145* (2013.01); *H04L 41/16* (2013.01); *H04L 43/0811* (2013.01); *H04L 43/50* (2013.01); *H04W 24/06* (2013.01); *G06N 20/00* (2019.01); *H04W 84/12* (2013.01)

(58) Field of Classification Search
None
See application file for complete search history.

(56) References Cited

U.S. PATENT DOCUMENTS

| | | | |
|---|---|---|---|
| 6,397,359 B1 * | 5/2002 | Chandra | H04L 41/5009 709/224 |
| 7,489,639 B2 | 2/2009 | Breitgand et al. | |
| 9,071,510 B2 | 6/2015 | Simhon et al. | |
| 9,544,207 B2 | 1/2017 | Allen et al. | |
| 2009/0089627 A1 * | 4/2009 | Matsubara | G06F 11/182 714/48 |
| 2012/0191837 A1 | 7/2012 | Blatchford et al. | |

(Continued)

OTHER PUBLICATIONS

Widanapathirana et al., "Automated Inference System for End-To-End Diagnosis of Network Performance Issues in Client-Terminal Devices", International Journal of Computer Networks & Communications (IJCNC) vol. 4, No. 3, May 2012, pp. 37-56, arXiv.org.

*Primary Examiner* — Scott M Sciacca
(74) *Attorney, Agent, or Firm* — Behmke Innovation Group LLC; Kenneth J. Heywood; Jonathon P. Western

(57) ABSTRACT

In one embodiment, a network assurance service that monitors a network detects a network anomaly in the network using a machine learning-based anomaly detector. The network assurance service identifies a set of network conditions associated with the detected network anomaly. The network assurance service initiates a network test on one or more clients in the network that exhibit the identified network conditions. The network assurance service retrains the machine learning-based anomaly detector based on a result of the network test.

20 Claims, 9 Drawing Sheets

(56) References Cited

U.S. PATENT DOCUMENTS

| | | | |
|---|---|---|---|
| 2015/0333992 A1* | 11/2015 | Vasseur | H04L 12/4641 |
| | | | 370/252 |
| 2016/0036844 A1* | 2/2016 | Kopp | G06F 16/2246 |
| | | | 726/1 |
| 2017/0099310 A1* | 4/2017 | Di Pietro | H04L 63/1425 |
| 2017/0302506 A1* | 10/2017 | Jinka | H04L 41/069 |
| 2018/0109975 A1* | 4/2018 | Kalliola | H04W 24/08 |
| 2018/0198812 A1* | 7/2018 | Christodorescu | H04L 41/145 |
| 2020/0014711 A1* | 1/2020 | Rego | H04L 63/1433 |
| 2020/0099606 A1* | 3/2020 | Mozealous | H04L 43/0876 |

* cited by examiner

MACHINE LEARNING-BASED CLIENT SELECTION AND TESTING IN A NETWORK ASSURANCE SYSTEM

TECHNICAL FIELD

The present disclosure relates generally to computer networks, and, more particularly, to machine learning-based client selection and testing in a network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
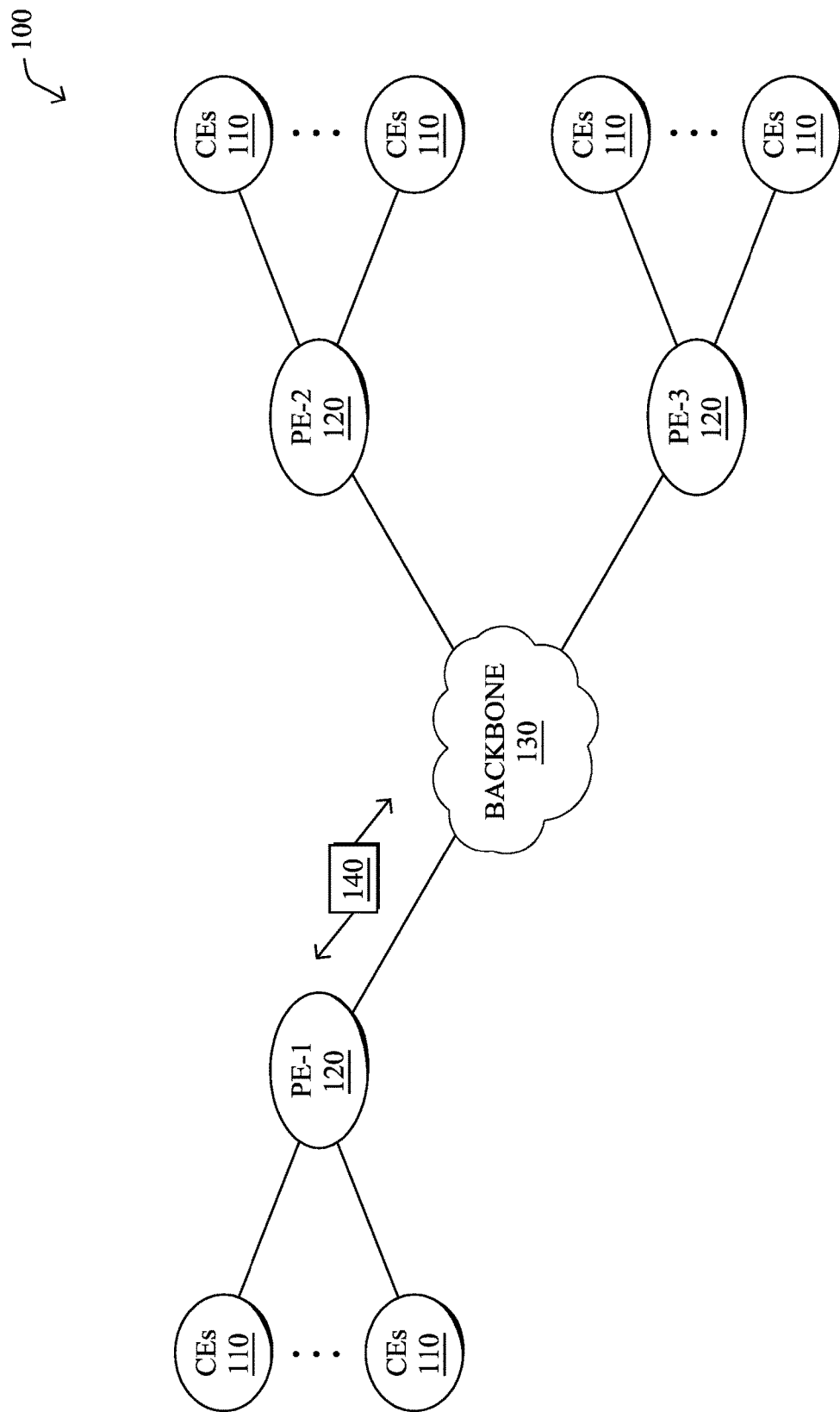
FIGS. 1A-1B illustrate an example communication network.

According to one or more embodiments of the disclosure, a network assurance service that monitors a network detects a network anomaly in the network using a machine learning-based anomaly detector. The network assurance service identifies a set of network conditions associated with the detected network anomaly. The network assurance service initiates a network test on one or more clients in the network that exhibit the identified network conditions. The network assurance service retrains the machine learning-based anomaly detector based on a result of the network test.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
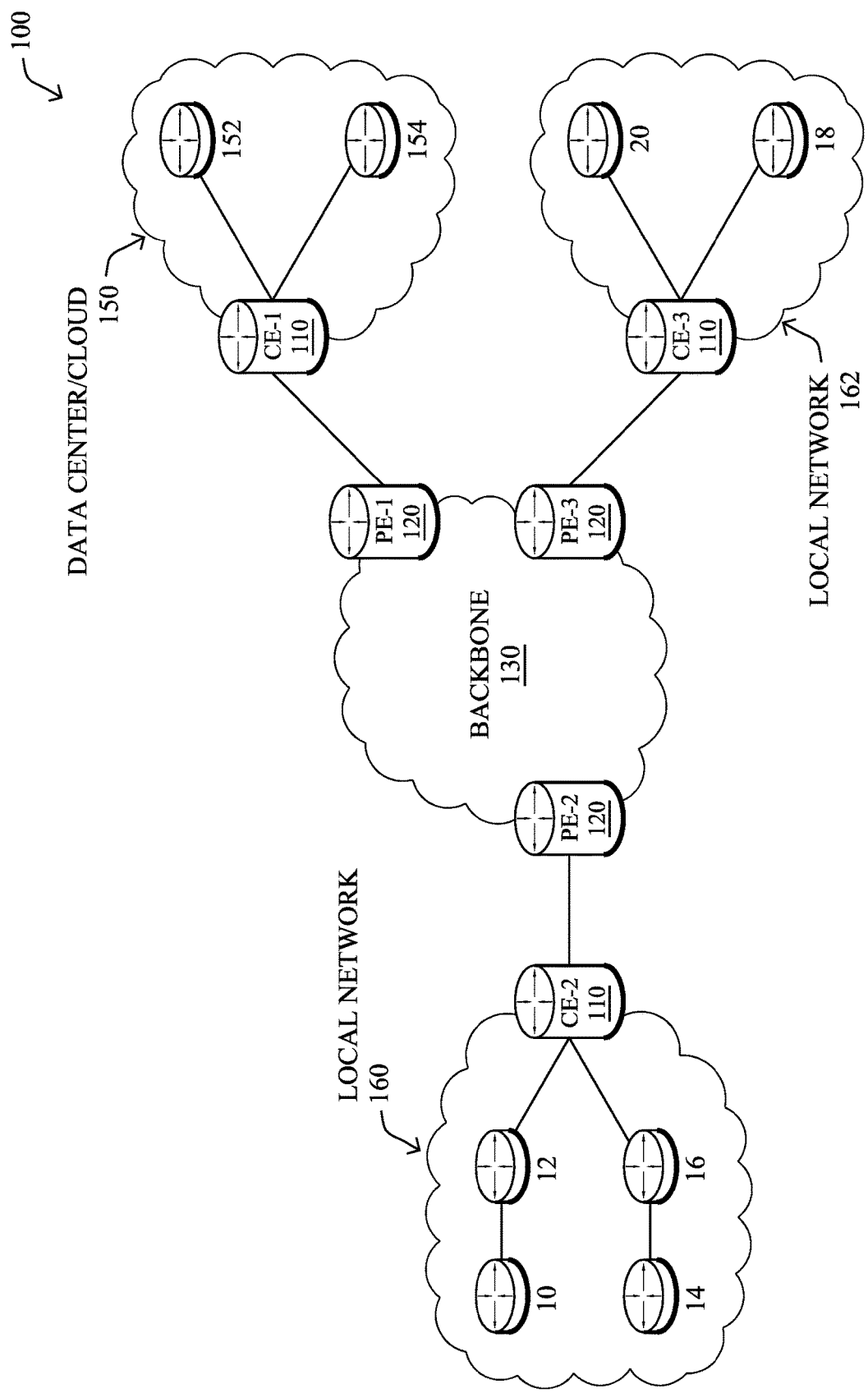

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network.

Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
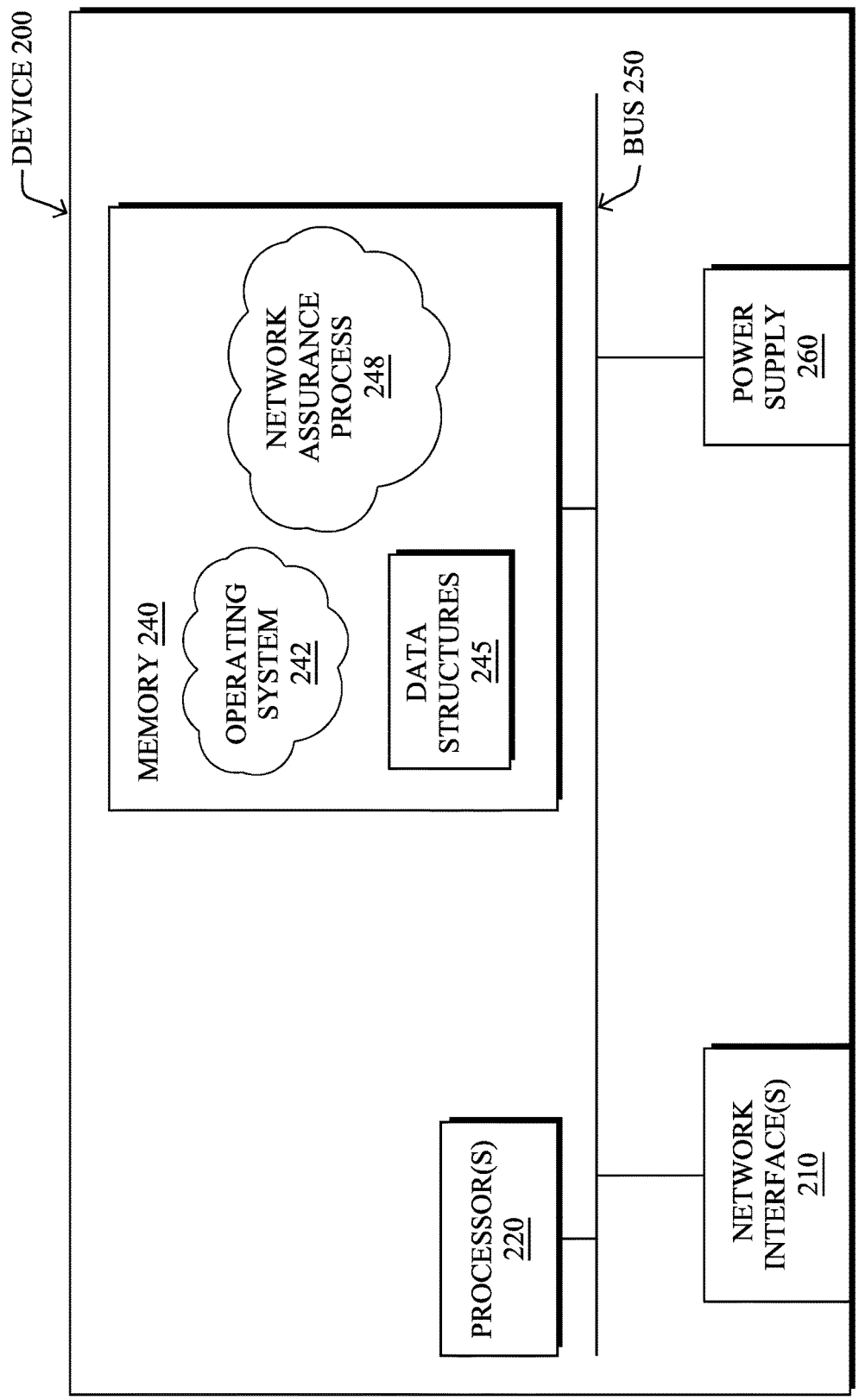
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
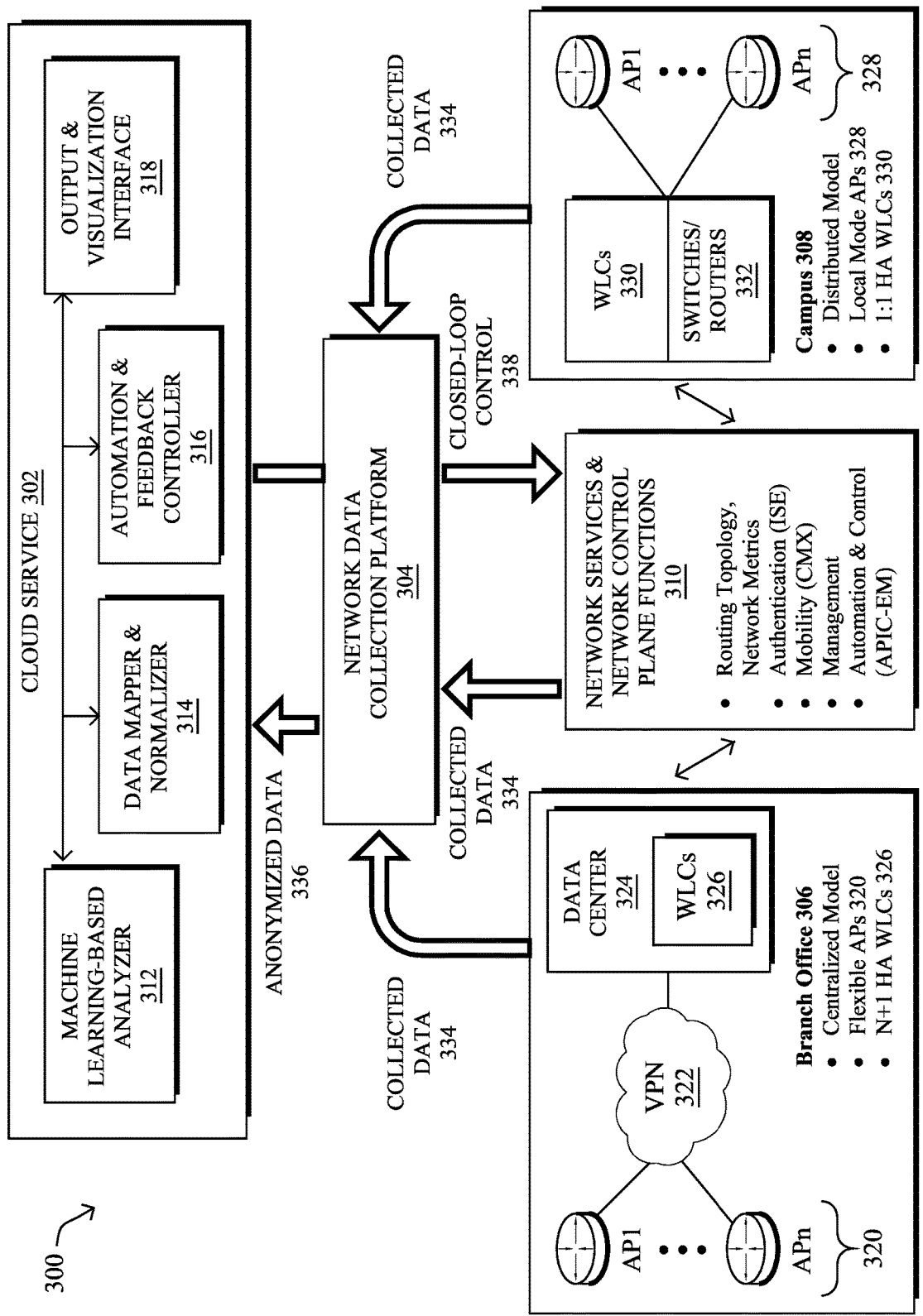
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, networks are complex distributed systems where multiple network devices and protocols interact with each other. Using the techniques described herein, machine learning can be leveraged to analyze the network data (e.g., JSON files from controllers, NetFlow data from telemetry collectors, etc.) and devise cognitive insights into the operations of the network. These cognitive insights can also be used for purposes of troubleshooting complex issues such as low throughput or high packet error events. To provide these insights, the network assurance service may: 1.) extract the main patterns of network conditions that are associated with a network problem and 2.) communicate the patterns to a network administrator in a simple and interpretable manner so that the administrator can act on the insights.

In many cases, the root cause of a network problem cannot be verified since there are many potential root causes. It is also fairly common to be lacking the telemetry data needed to pinpoint the actual root cause of the network problem. One solution would be to simply collect the maximum available telemetry data at all times, but this is often not practical due to resource constraints. In other cases, what is needed to diagnose the network problem is a client-centric view of the network problem. However, similar to telemetry data from the network itself, gathering such client telemetry data can also impact the resource consumption of the client device, particularly the battery of the device.

Machine Learning-Based Client Selection and Testing in a Network Assurance System The techniques herein introduce a distributed network testing mechanism that can be used to test across a selected set of clients, so as to identify the root cause of a network problem. In some aspects, machine learning can be used to assess historic client data from when issues were observed, to perform a test of the network using a selected set of clients. Notably, the test may be run on clients identified as exhibiting some, or all, of the network conditions associated with the detected network problem or other anomaly.

Specifically, according to one or more embodiments of the disclosure as described in detail below, a network assurance service that monitors a network detects a network anomaly in the network using a machine learning-based anomaly detector. The network assurance service identifies a set of network conditions associated with the detected network anomaly. The network assurance service initiates a network test on one or more clients in the network that exhibit the identified network conditions. The network assurance service retrains the machine learning-based anomaly detector based on a result of the network test.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
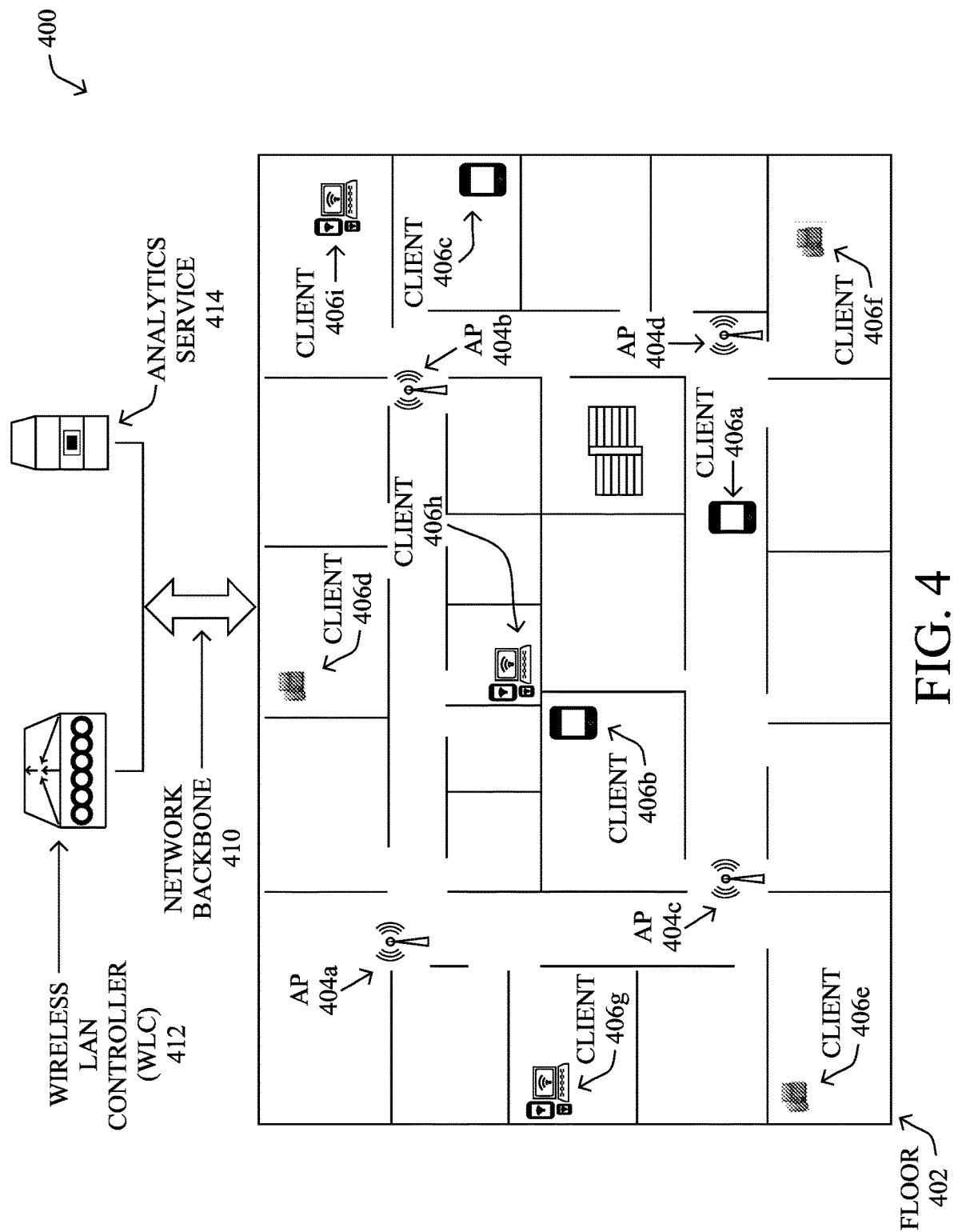
FIG. 4 illustrates an example wireless network.

Operationally, FIG. 4 illustrates an example wireless network 400, according to various embodiments. Wireless network 400 may be deployed to a physical location, such as floor 402 shown, and may include various infrastructure devices. These infrastructure devices may include, for example, one or more access points (APs) 404 that provide wireless connectivity to the various wireless clients 406 distributed throughout the location. For illustrative purposes, APs 404a-404d and clients 406a-406i are depicted in FIG. 4. However, as would be appreciated, a wireless network deployment may include any number of APs and clients. Also, while the techniques herein are described using a wireless network, the techniques can also just as easily be applied to wired or hybrid wired/wireless network in which some of the clients use a hardwired connection.

A network backbone 410 may interconnect APs 404 and provide a connection between APs 404 and any number of supervisory devices or services that provide control over APs 404. For example, as shown, a wireless LAN controller (WLC) 412 may control some or all of APs 404a-404d, by setting their control parameters (e.g., max number of attached clients, channels used, wireless modes, etc.). Another supervisory service that oversees wireless network 400 may be an analytics service 414 (e.g., a network assurance service) that measures and monitors the performance of wireless network 400 and, if so configured, may also adjust the operation of wireless network 400 based on the monitored performance (e.g., via WLC 412, etc.).

Network backbone 410 may further provide connectivity between the infrastructure of the local network and a larger network, such as the Internet, a Multiprotocol Label Switching (MPLS) network, or the like. Accordingly, WLC 412 and/or analytics service 414 may be located on the same local network as APs 404 or, alternatively, may be located remotely, such as in a remote datacenter, in the cloud, etc. To provide such connectivity, network backbone 410 may include any number of wired connections (e.g., Ethernet, optical, etc.) and/or wireless connections (e.g., cellular, etc.), as well as any number of networking devices (e.g., routers, switches, etc.).

The types, locations, and configurations of clients 404 in network 400 can vary greatly. For example, clients 406a-406c may be mobile phones, clients 406d-406f may be office phones, and clients 406g-406i may be computers, all of which may be of different makes, models, installed applications, chipsets, and the like. These variations can all lead to situations in which a network issue affects only a subset of clients 404.

Figure 5:
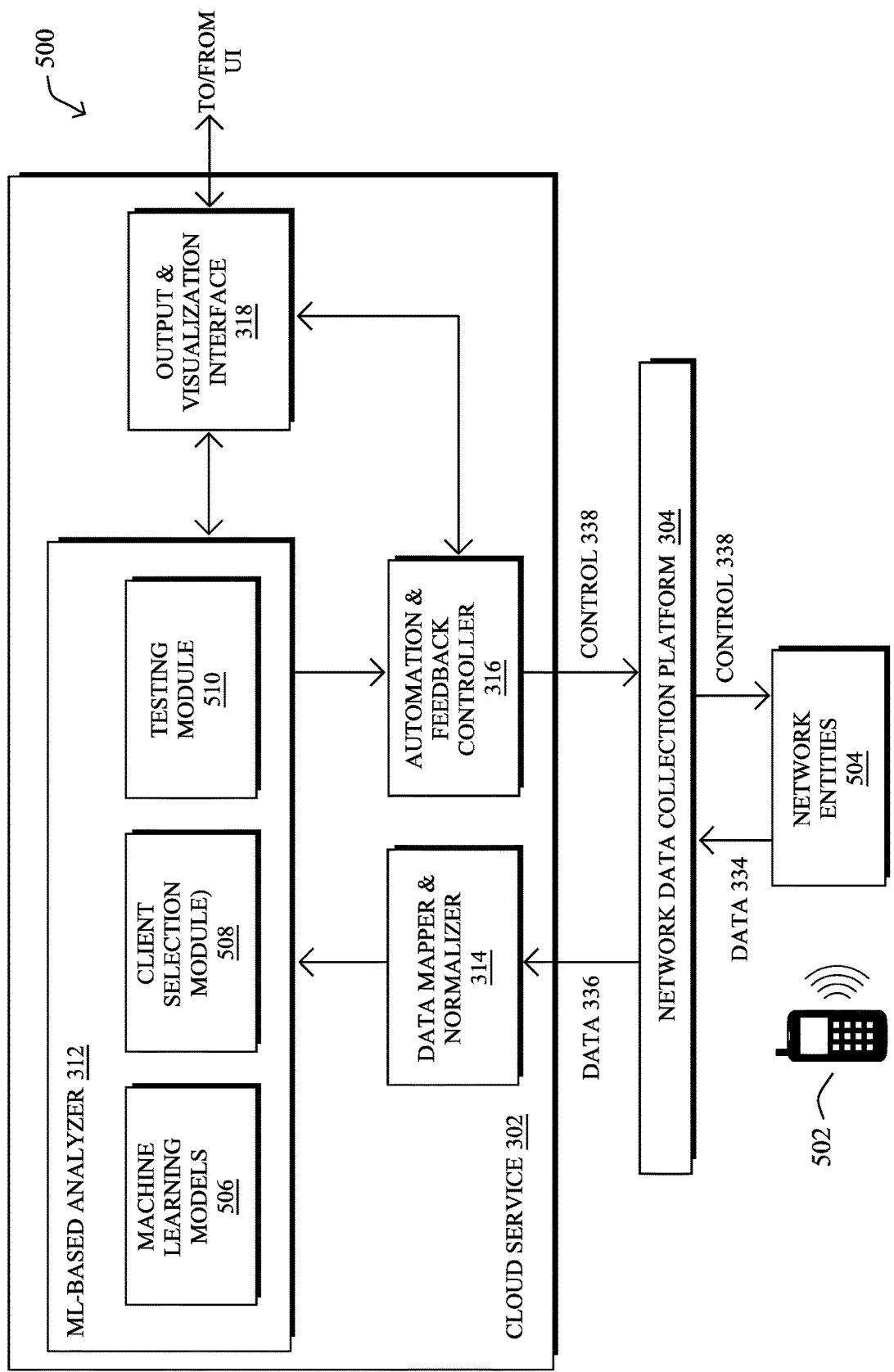
FIG. 5 illustrates an example architecture for initiating a network test.

FIG. 5 illustrates an example architecture 500 for initiating a network test, according to various embodiments. At the core of architecture 400 may be the following components: one or more machine learning models 506, a client selection module 508, and a testing module 510. In some implementations, the components of architecture 500 may be implemented within a network assurance system, such as system 300 shown in FIG. 3. Accordingly, the components 506-510 of architecture 500 shown may be implemented as part of cloud service 302 (e.g., as part of machine learning-based analyzer 312), as part of network data collection platform 304, and/or on one or more network elements/entities 504 that communicate with one or more client devices 502 within the monitored network itself. Further, these components may be implemented in a distributed manner or implemented as its own stand-alone service, either as part of the local network under observation or as a remote service. In addition, the functionalities of the components of architecture 500 may be combined, omitted, or implemented as part of other processes, as desired.

As noted above, machine learning-based analyzer 312 may include any number of machine learning models 506 that model the behavior of the monitored network(s). For example, model(s) 506 may model the throughput, packet characteristics (e.g., drops, jitter, delay, etc.), onboarding conditions (e.g., failures, timing, etc.), etc., in the aggregate and/or on a per-application basis. To this end, model(s) 506 may be machine learning-based anomaly detectors, in some embodiments, that are able to detect when the network behavior is anomalous. For example, one model 506 may detect low throughput for a video conferencing application in the network.

While machine learning-based anomaly detection is able to detect anomalous network behavior that would not otherwise be detectable, the underlying cause of the anomalous behavior may not be readily apparent. In particular, a network administrator may still be left wondering whether the issue is due to the network itself or to the client(s) that experienced the issue. It may also very well be the case that the telemetry data needed for the root cause analysis was not actually captured when the issue occurred. For example, if client 502, itself, was not capturing telemetry data when the issue occurred, it may be impossible to rule out client 502 as the potential root cause of the issue.

In order to identify the root cause of a network anomaly detected by a machine learning model 506, service 302 may include client selection module 508 and testing module 510, according to various embodiments. In particular, these components allow service 302 to explore different scenarios to verify whether the anomalous condition reoccurs in the network, while not subjecting the entire network to the test.

During execution, client selection module 508 may select clients for testing that exhibit the network conditions associated with a network anomaly detected by model(s) 506. For example, consider a media throughput anomaly that affects a certain set of clients connected to a particular AP in the network. Such clients may communicate with the AP using 2.4 GHz and have a received signal strength indicator (RSSI) values between −70 dBm and −80 dBm. In such a case, client selection module 508 may start by selecting a superset of these network conditions associated with the anomalous condition and, in turn, selecting a set of clients for testing that exhibit these conditions.

In some embodiments, client selection module 508 may use a machine learning-based decision tree, to select clients to participate in a network test. Notably, client selection module 508 may build a decision tree with a target value of when the issue occurred. The input features for the decision tree may then be the network conditions such as, but not limited to, client-dependent parameters including RSSI, client type, client operating system, highest protocol supported, spatial streams, etc. and RF parameters including interference, number of clients connected to the AP, AP load, total radio throughput, etc.

Figure 6A:
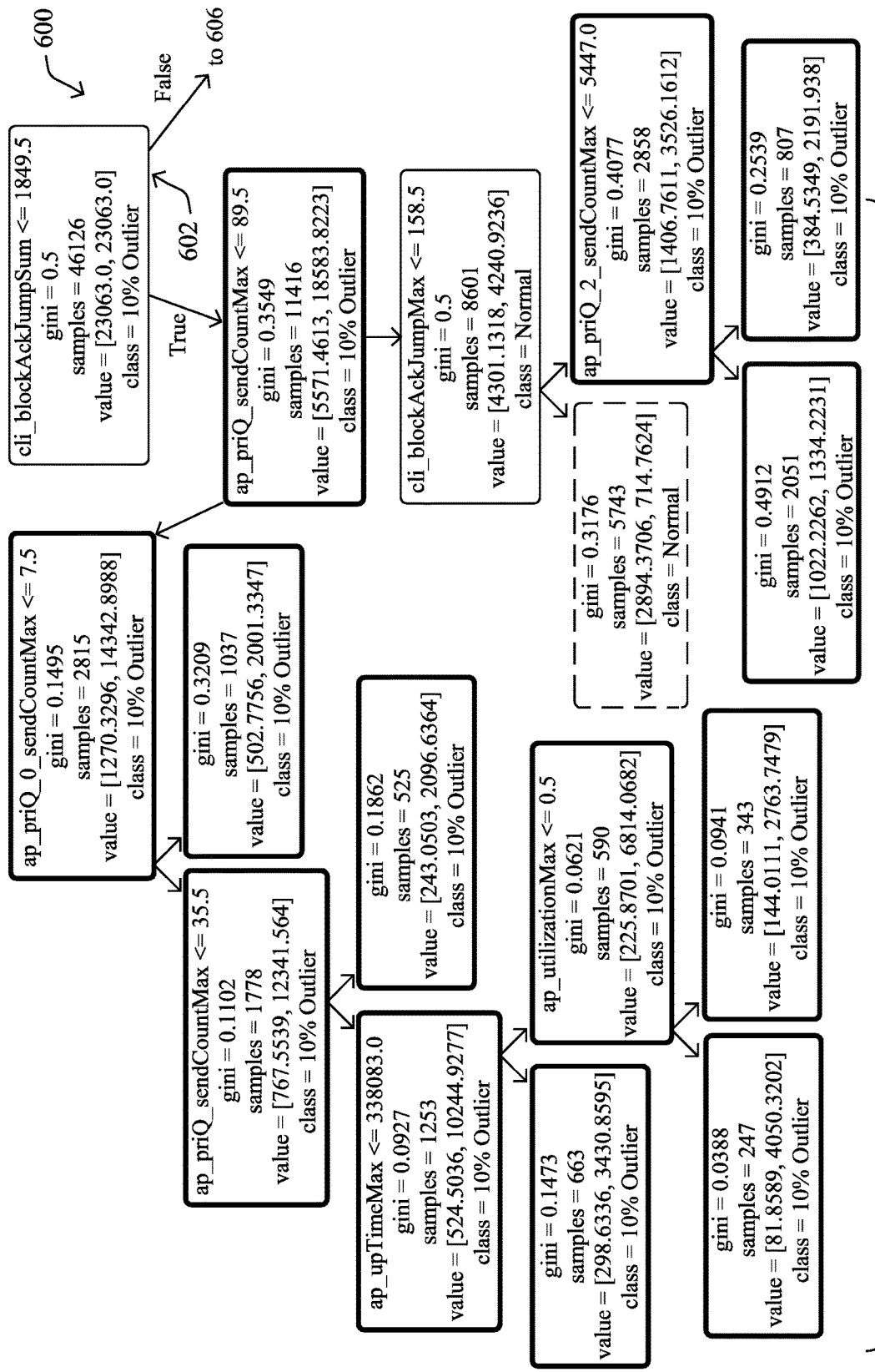
FIGS. 6A-6B illustrate an example decision tree for selecting a client to participate in a network test.
Figure 6B:
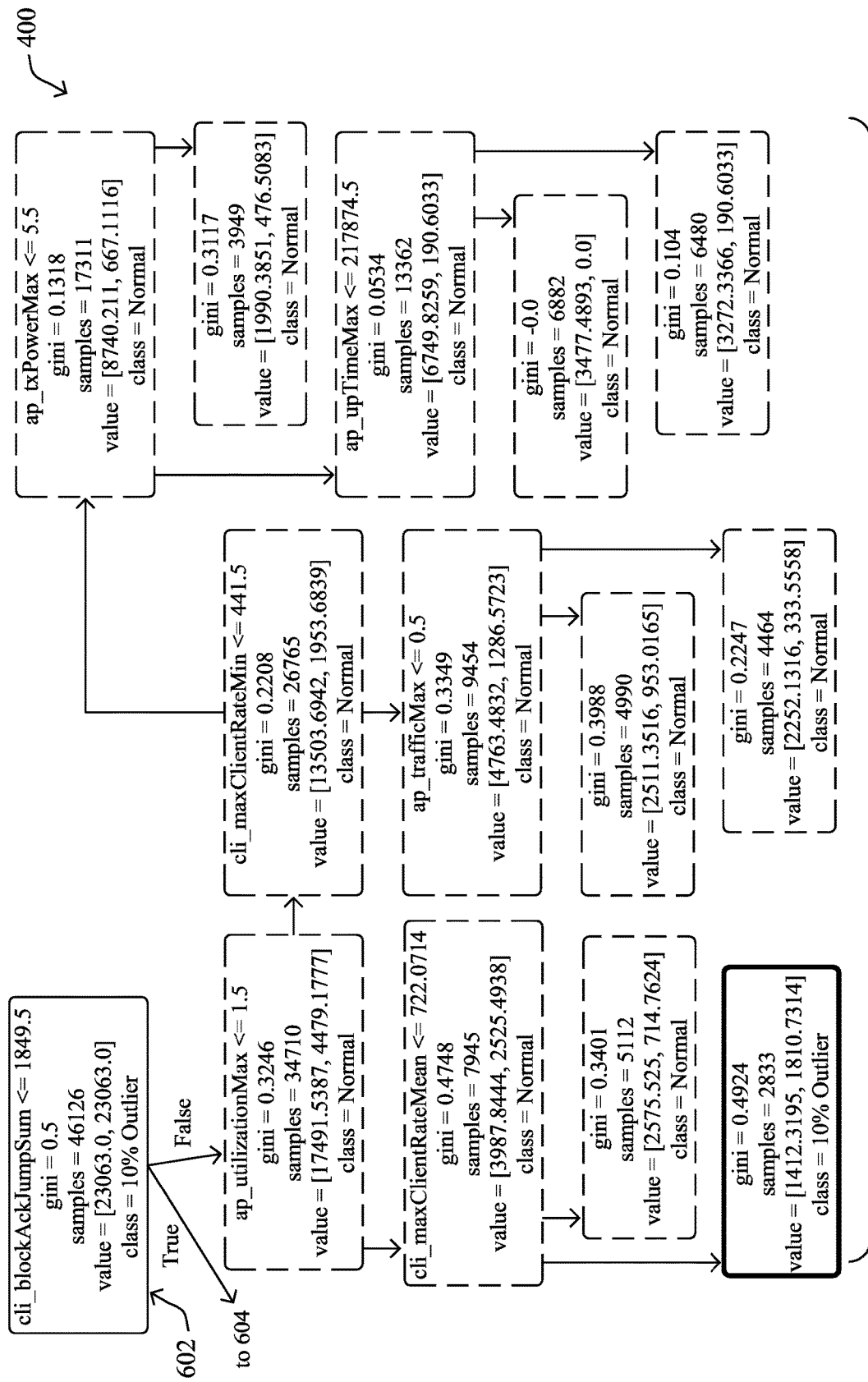

FIGS. 6A-6B illustrate an example decision tree 600 for selecting a client to participate in a network test, in various embodiments. In general, in tree-based models, the algorithm performs various splits on features and their values while maximizing a function, such as mutual information or cross entropy, at each node. The end result is a set of features and their split-values, with the features ranked by relative importance with respect to a purity metric, such as the Gini coefficient. These features are the key predictors in the classification of failure event occurrences. This approach differs from classification models by making explicit the values on which to split each feature at the start (e.g., the 'tags').

As shown in FIG. 6A, decision tree 600 illustrates cases of low throughput, identified as 10% outliers. In particular, decision tree 600 may be based on any number of different network conditions, such as client block acknowledgement (ACK) jumps on APs, AP channel utilization, AP transmit power, maximum client rate, etc. From node 602, two branches exist: branch 604 that is followed if the conditions of node 602 are satisfied and branch 606 that is follows if not. Branch 606 is illustrated in FIG. 6B. Comparatively, the majority of nodes in branch 604 are not 10% outliers.

From decision tree 600, client selection can be performed by selecting those clients that are experiencing a large client block ACK jumps on APs which have low channel utilization (<0.5%). This decision tree results would be used to sample all the clients to create a subset of current clients which meet the above criteria.

Referring again to architecture 500 in FIG. 5, another consideration that client selection module 506 may take into account is the ability of a given client to participate in a test of the network. For example, client 502 may only be a candidate for the test if it is has an agent installed that is capable of running the required test. Such a client-executed agent may be an infrastructure application, such as Any-Connect, a CMX application or SDK on a smartphone, or the like. In other cases, client selection module 506 may select client 502 to participate in the test, if client 502 is capable of providing simple network telemetry data via 802.11k or 802.11v. In other words, the capabilities of the clients in the network may further reduce the set of clients exhibiting the network conditions associated with the anomaly into a subset selectable for purposes of testing. In further embodiments, other considerations that client selection module 508 may take into account are the diversity of the selected clients (e.g., to maximize the different types, configurations, etc. of the selected clients) and/or the resources available at the clients (e.g., to avoid using a client running on low power for the test).

Client selection module 508 may run the selection process periodically or as needed, such as when a new network anomaly is detected by model(s) 506. It is also expected that, in some cases, no client may meet the decision tree criteria of client selection module 508 and no test can be run. For example, the network anomaly may occur at nighttime, when there are few, if any clients available and eligible to perform a network test. In some embodiments, client selection module 508 may also purposely exclude certain clients from consideration, such as by employing a round robin selection approach, so as to avoid selecting the same clients over and over.

Once client selection module 508 has selected the subset of network clients to participate in the network test, testing module 510 may initiate the network test either immediately or at a scheduled time. To do so, testing module 510 may send control instructions to the appropriate network entities 504 and/or client 502 via automation and feedback controller 316. Note that custom signaling extensions using 802.11kv may be used to request the triggering of the application running the test on the client (e.g., to request that a particular test be run, for a given duration, for number of times, according to a given schedule, etc.).

In addition to requesting certain clients participate in the network test, testing module 510 may also request that certain network entities 504 collect additional telemetry data regarding the selected clients. For example, if certain clients are selected to participate in the test, testing module 510 may instruct the APs to which the clients are attached, network switches, or the like, to gather and report additional telemetry data for these clients back to testing module 510 (e.g., packet captures, etc.). In combination with logs from the agents executed by the clients, this will allow testing module 510 to identify the root cause of the network anomaly. In turn, testing module 510 may report the test results to a user interface, such as via output and visualization interface 318.

There are many tests that may be needed to run on the selected clients, to pinpoint the root cause of the detected anomaly. Accordingly, testing module 510 may choose to run all of the network tests on the full set of selected clients or, alternatively, running only a subset of the tests on a few clients, to increase the test efficiency and speed up the root cause analysis.

By way of example, assume that the detected anomaly is a media throughput anomaly. In such a case, testing module 510 may select a set of clients 502 on which to run a first media application, such as WebEx, a second media application, such as Skype for business, etc. These can be prioritized and testing module 510 may use a weighted majority, to determine whether a particular application is the root cause of the network anomaly under certain network conditions.

In general, testing may entail exploring different sets of network conditions, to identify the one or more conditions at the root cause of the detected anomaly. For example, as noted above, one test may entail generating application traffic for different client application and testing whether the anomalous condition re-occurs. Other tests, of course, can be performed based on the networking conditions that led to the selection of the test clients (e.g., attached AP, wireless channel in use, etc.). Thus, if model(s) 506 re-detect the anomalous network behavior during the test, the corresponding telemetry data collected by the clients 502 and/or network entities 504 can be used to identify the underlying cause of the anomaly.

While the cause of a network anomaly may be at the client level or at the network level, another possibility is that the anomaly detection model itself was simply incorrect in its assessment. In further embodiments, testing module 510 may also be configured to detect false positives from model(s) 506 and trigger retraining of the model 506 when appropriate. For example, if the network test indicates that no issues were detected by client 502, but model 506 still detected a network anomaly, testing module 510 may flag the anomaly as such and cause model 506 to be retrained. Optionally, testing module 510 can also request that client 502 send actual test data to service 302 (e.g., packet captures, application MoD, etc.) that can also be used for purposes of model retraining.

Figure 7:
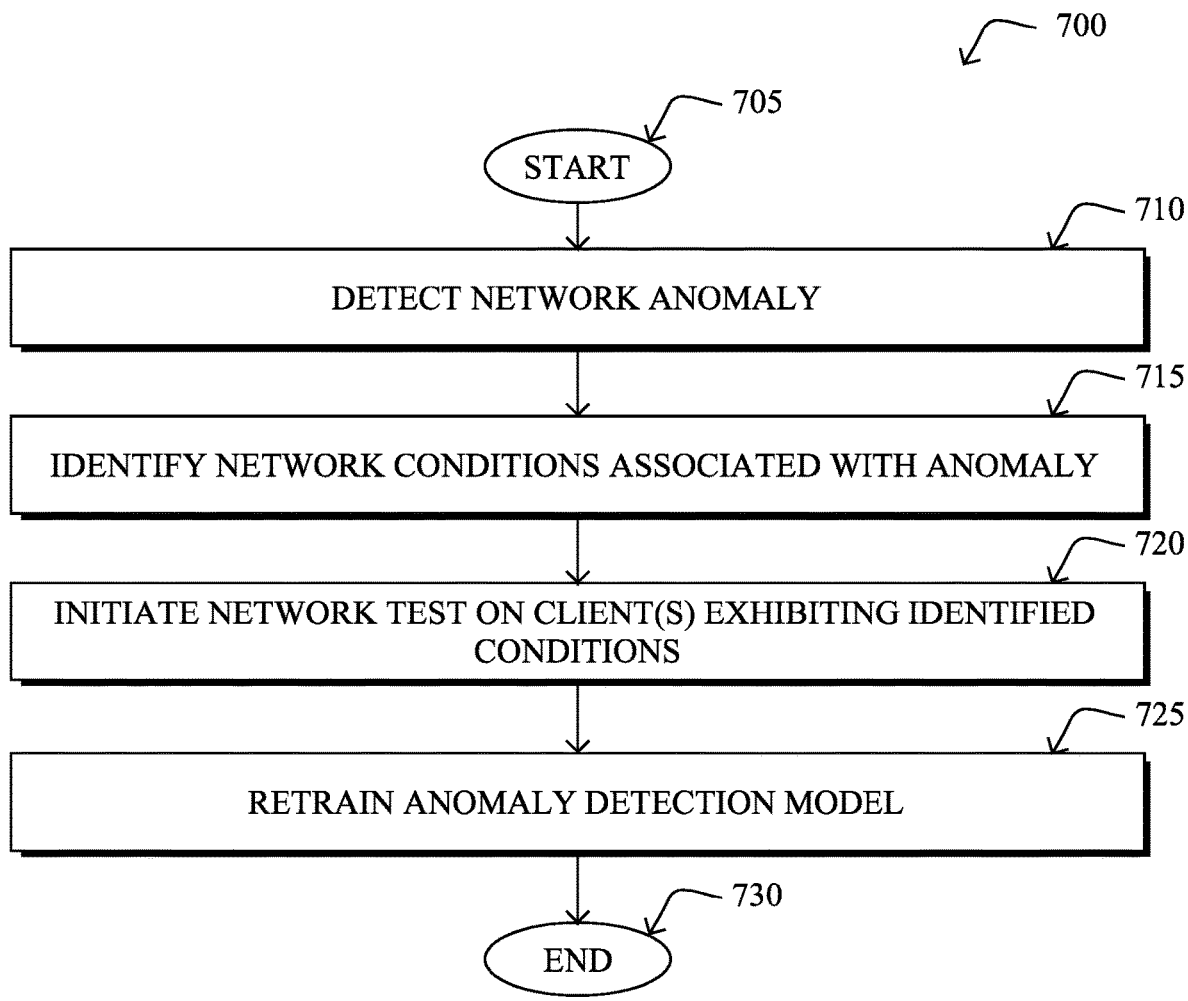
FIG. 7 illustrates an example simplified procedure for performing a network test.

FIG. 7 illustrates an example simplified procedure for performing a network test, in accordance with one or more embodiments described herein. For example, a non-generic, specifically configured device (e.g., device 200) may perform procedure 700 by executing stored instructions (e.g., process 248), to provide a network assurance service to a monitored network. The procedure 700 may start at step 705, and continues to step 710, where, as described in greater detail above, the network assurance service may detect a network anomaly in the network using a machine learning-based anomaly detector. Such an anomaly detector may detect any number of anomalous behaviors, such as throughput anomalies, wireless client onboarding anomalies, roaming anomalies, and the like.

At step 715, as detailed above, the network assurance service may identify a set of network conditions associated with the detected network anomaly. Notably, there may be any number of data points regarding the network conditions during the network anomaly that can be extracted from the telemetry data from the network. For example, the network conditions may include, but are not limited to, RSSI information, client type information (e.g., wired vs. wireless, make and model, etc.), client configuration information (e.g., executing applications, OS, device resource information, etc.), or radio frequency information (e.g., number of attached clients to an AP, wireless channel information, etc.).

At step 720, the network assurance service may initiate a network test on one or more clients in the network that exhibit the identified network conditions. In some embodiments, the network assurance service may send control instructions to local agents of the selected clients, to request that the clients send certain types of traffic and/or start collecting certain types of telemetry data during such a test. For example, if the anomaly is throughput-related, the service may select a subset of the clients in the network to begin sending traffic from different media applications. In doing so, the service can collect additional telemetry data and determine whether a particular application is to blame for the network anomalies.

At step 725, as detailed above, the network assurance service may retrain the machine learning-based anomaly detector based on a result of the network test. For example, if the agents of the selected clients did not detect a network issue that corresponds to the network anomaly detected by the network assurance service, the service may deem the detected anomalies as false positives. In such a case, the service may trigger retraining of the machine learning-based anomaly detector. Of course, if the test results indicate true positives, the service may likewise use the test results to identify the root cause and report it via a user interface to a network administrator. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a machine learning-based network assurance service to not only detect anomalous network behavior, but to also verify the underlying cause of the behavior. In some aspects, the techniques allow the service to intelligently run network tests on selected clients, to explore potential root causes. If the results of the test indicate that the detected anomalies were false positives, the techniques herein also allow the anomaly detection model to be retrained, thus progressively improving on the model over time.

While there have been shown and described illustrative embodiments that provide for machine learning-based client selection and testing in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a network assurance service that monitors a network, a network anomaly in the network using a machine learning-based anomaly detector;
   identifying, by the network assurance service, a set of network conditions associated with the detected network anomaly;
   evaluating, by the network assurance service, a plurality of clients in the network based on the identified network conditions and on a capability of running a network test to create a subset of clients in the network that exhibit the identified network conditions and are capable of running the network test;
   initiating, by the network assurance service, the network test on the created subset of clients during which the network assurance service determines whether the network anomaly detected by the machine learning-based anomaly detector is also detected locally at the created subset of clients; and
   retraining, by the network assurance service, the machine learning-based anomaly detector based on a result of the network test.

2. The method as in claim 1, wherein initiating the network test further comprises:
   controlling, by the network assurance service, an access point in the network to capture additional information regarding the subset of clients during the network test.

3. The method as in claim 1, wherein initiating the network test further comprises:
   instructing, by the network assurance service, an agent executed by the subset of clients in the network to generate a specified type of network traffic during the network test.

4. The method as in claim 3, further comprising:
   receiving, at the network assurance service, test result data collected by the agent during the network test.

5. The method as in claim 1, wherein identifying the set of network conditions associated with the detected network anomaly comprises:
  using a machine learning-based decision tree on a plurality of network conditions, to identify the set of network conditions associated with the detected network anomaly from among the plurality.

6. The method as in claim 1, wherein the network conditions comprise one or more of: received signal strength indicator (RSSI) information, client type information, client configuration information, or radio frequency information.

7. The method as in claim 1, wherein the machine learning-based anomaly detector comprises an unsupervised anomaly detection model.

8. The method as in claim 1, further comprising:
  determining, by the network assurance service, that the detected anomaly was a false positive when the anomaly detected by the machine learning-based anomaly detector is not also detected locally at the created subset of clients during the network test.

9. The method as in claim 1, wherein the subset of clients include one or more wireless clients of the network.

10. The method as in claim 1, wherein the network assurance service is a cloud-based service.

11. An apparatus comprising:
  one or more network interfaces to communicate with a wireless network;
  a processor coupled to the network interfaces and configured to execute one or more processes; and
  a memory configured to store a process executable by the processor, the process when executed configured to:
    detect a network anomaly in the network using a machine learning-based anomaly detector;
    identify a set of network conditions associated with the detected network anomaly;
    evaluate a plurality of clients in the network based on the identified network conditions and on a capability of running a network test to create a subset of clients in the network that exhibit the identified network conditions and are capable of running the network test;
    initiate the network test on the created subset of clients during which the apparatus determines whether the network anomaly detected by the machine learning-based anomaly detector is also detected locally at the created subset of clients; and
    retrain the machine learning-based anomaly detector based on a result of the network test.

12. The apparatus as in claim 11, wherein the apparatus initiates the network test by:
  controlling an access point in the network to capture additional information regarding the subset of clients during the network test.

13. The apparatus as in claim 11, wherein the apparatus initiates the network test by:
  instructing an agent executed by the subset of clients in the network to generate a specified type of network traffic during the network test.

14. The apparatus as in claim 13, wherein the process when executed is further configured to:
  receive test result data collected by the agent during the network test.

15. The apparatus as in claim 11, wherein the apparatus identifies the set of network conditions associated with the detected network anomaly comprises:
  using a machine learning-based decision tree on a plurality of network conditions, to identify the set of network conditions associated with the detected network anomaly from among the plurality.

16. The apparatus as in claim 11, wherein the network conditions comprise one or more of: received signal strength indicator (RSSI) information, client type information, client configuration information, or radio frequency information.

17. The apparatus as in claim 11, wherein the machine learning-based anomaly detector comprises an unsupervised anomaly detection model.

18. The apparatus as in claim 11, wherein the process when executed is further configured to:
  determine that the detected anomaly was a false positive when the anomaly detected by the machine learning-based anomaly detector is not also detected locally at the created subset of clients during the network test.

19. The apparatus as in claim 11, wherein the subset of clients include one or more wireless clients of the network.

20. A tangible, non-transitory, computer-readable medium storing program instructions that cause a network assurance service that monitors a network to perform a process comprising:
  detecting, by the network assurance service that monitors the network, a network anomaly in the network using a machine learning-based anomaly detector;
  identifying, by the network assurance service, a set of network conditions associated with the detected network anomaly;
  evaluating, by the network assurance service, a plurality of clients in the network based on the identified network conditions and on a capability of running a network test to create a subset of clients in the network that exhibit the identified network conditions and are capable of running the network test;
  initiating, by the network assurance service, the network test on the created subset of clients during which the network assurance service determines whether the network anomaly detected by the machine learning-based anomaly detector is also detected locally at the created subset of clients; and
  retraining, by the network assurance service, the machine learning-based anomaly detector based on a result of the network test.

* * * * *

UNITED STATES PATENT AND TRADEMARK OFFICE
CERTIFICATE OF CORRECTION

PATENT NO. : 11,038,775 B2
APPLICATION NO. : 16/100451
DATED : June 15, 2021
INVENTOR(S) : Santosh Ghanshyam Pandey et al.

It is certified that error appears in the above-identified patent and that said Letters Patent is hereby corrected as shown below:

In the Specification

Column 13, Line 37, please amend as shown:
candidate for the test if it has an agent installed that is Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*